J. STEWART.
Potato Digger.

No. 83,670.  Patented Nov. 3, 1868.

WITNESSES:

INVENTOR:

JOHN STEWART, OF JACKSON, MICHIGAN.

Letters Patent No. 83,670, dated November 3, 1868.

IMPROVEMENT IN POTATO-DIGGERS.

The Schedule referred to in these Letters Patent and making part of the same.

*To whom it may concern:*

Be it known that I, JOHN STEWART, of Jackson, in the county of Jackson, and State of Michigan, have invented a new and useful Improvement in Potato-Diggers; and I do declare that the following is a true and accurate description thereof, reference being had to the accompanying drawings, and to the letters of reference marked thereon, and being a part of this specification.

Like letters indicate like parts in each figure.

Figure 1:
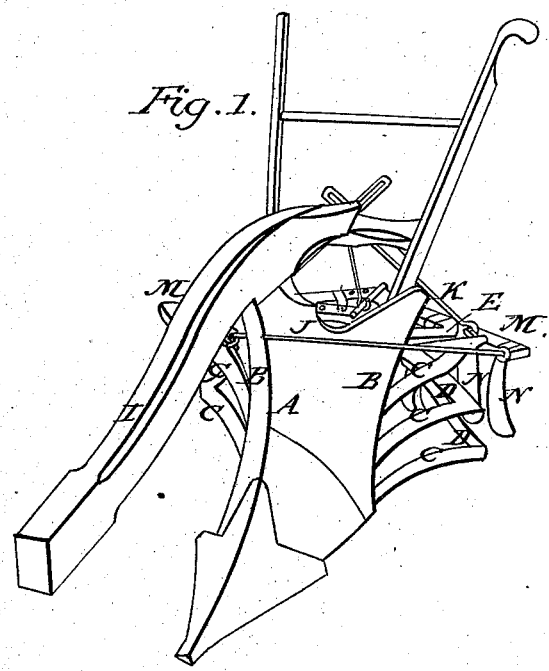
Figure 1 is a perspective view of my invention from the front.
Figure 2:
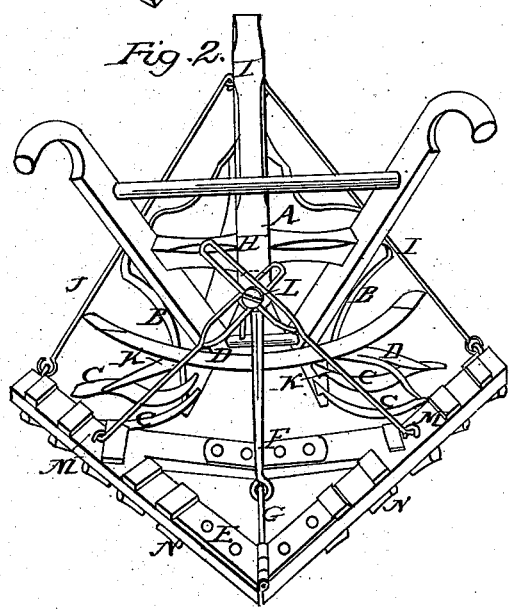
Figure 2 is a rear perspective view, partially in section.

The nature of this invention is to so construct an apparatus for the purpose of digging potatoes, that it will be economical to build, easy to operate, sure and effectual in its results, and at the same time may be used as a plow and cultivator, which will thoroughly pulverize the soil.

In order to accomplish this end, I construct a double mould-board plow, A, in the usual form, except, perhaps, shortening the rear ends of the mould-boards B, to which are attached curved bars or wings, C, connected and held in place by any suitable braces, D. These braces consist of bent pieces, acting like springs, which hold the wings C in position, but make them yielding instead of stiff. The braces D are connected to each other by bolts passed through them at their centre.

Then I construct a triangular frame, E, in two parts, hinged together at F, upon rod G, which, at its inner end, is pivoted to the standard H.

Extending from the beam I to the outer ends of the frame E are the braces J, while K are other braces, centring at the rear end of the beam, where they are held in place by rod L, passing through slots in their ends, into the end of said beam. In this way I am able to adjust the position of the frame E as may be desired.

At suitable distances apart, I attach to the bars M of said frame, in any suitable manner, teeth, N, in such a manner as to throw or turn to a common centre.

The frame E and its attachments may be so secured to the plow that they may readily be detached, when it is desired simply to use the plow, while the whole apparatus together will be found to be an effectual tool with which to pulverize and prepare the earth for planting.

In the operation of this implement for digging potatoes, the plow will pass under and through the row, turning out the potatoes on top of the ground, the bars or wings C tending to thoroughly sift them from the earth, while the teeth N, of the rear attachment, will draw them to the centre, leaving them on top of the ground, ready to be picked up.

What I claim as my invention, and desire to secure by Letters Patent, is—

1. The extension of the mould-boards B, by means of the curved bars or wings C, when the latter are held and rendered yielding by means of braces D, constructed and operating substantially as herein set forth.

2. The triangular frame E, with its attachments, in connection with plow A, when constructed, arranged, and operating substantially as and for the purposes specified.

J. STEWART.

Witnesses:
H. F. EBERTS,
LOUIS C. HYDE.